United States Patent [19]

Beauch et al.

[11] Patent Number: 4,805,476

[45] Date of Patent: Feb. 21, 1989

[54] TRANSMISSION SHIFT CONTROL ASSEMBLY

[75] Inventors: Howard D. Beauch, Frankenmuth; Benjamin H. Everett, II; Frederick P. Arndt, both of Saginaw, all of Mich.

[73] Assignee: General Motors Corporation, Detroit, Mich.

[21] Appl. No.: 189,855

[22] Filed: May 3, 1988

[51] Int. Cl.⁴ ............................................. G05C 9/16
[52] U.S. Cl. ............................ 74/473 SW; 74/475; 74/493
[58] Field of Search .................. 74/743 SW, 493, 475

[56] References Cited

U.S. PATENT DOCUMENTS

| | | | |
|---|---|---|---|
| 2,198,681 | 4/1940 | Slack | 74/473 SW |
| 2,504,285 | 4/1950 | Wahlberg et al. | 74/473 SW |
| 4,537,088 | 8/1985 | Kubota | 74/473 SW |
| 4,635,497 | 1/1987 | Siewert et al. | 74/473 SW |
| 4,762,015 | 8/1988 | Katayama | 74/473 SW |

Primary Examiner—Peter A. Aschenbrenner
Attorney, Agent, or Firm—Donald F. Scherer

[57] ABSTRACT

A transmission shift control assembly for a tilting steering column assembly has a rotary arm member to which a transmission shift control cable is attached. The rotary motion at the arm member translates to linear motion at the cable. The arm member is connected with a detent control which has stop members to limit the rotary motion and a locating member to position the shift control at the selected transmission operating condition. A manual lever is secured with the detent control and the arm member to permit operator selection of the desired transmission operating condition. The manual lever pivots a portion of the detent control about one axis to release it from the locating portion so that upon rotation of the manual lever about another axis intersecting the first axis, a change in transmission operation can be selected. The steering column is tiltable about an axis which passes through the point of intersection of the other two axes.

2 Claims, 2 Drawing Sheets

TRANSMISSION SHIFT CONTROL ASSEMBLY

BACKGROUND OF THE INVENTION

This invention relates to transmission control systems and more particularly to manually operated transmission control mechanisms.

In column mounted shift control mechanisms which utilize cable members for a connection between the operator control and the transmission manual valve, there are two basic type systems. These systems can be referred to as concentric or linear shift type systems.

In the concentric shift type system, the shift mechanism is rotatable either about the axis of the steering column or an axis substantially parallel the steering column. The transmitter cable of the concentric type system is generally connected to an arm near the lower end of the steering column and from there routed to the transmission. Concentric shift mechanisms generally require a shift bowl, a long shift tube, mounting brackets and support bearings for supporting the shift tube for rotary movement within the brackets.

With linear shift type systems, the transmission shift cable is generally routed parallel to the steering column longitudinal axis and is connected to a member that is pivotally mounted for moving the cable in a substantially linear path.

Steering column mounted linear shift mechanisms disclosed in the prior art utilize a ball and cam system for transferring from the rotary motion of the shift lever to linear motion of the shift cable. An example of a system such as this is shown in U.S. Pat. No. 4,733,573 issued Mar. 29, 1988, to Kramer and assigned to the assignee of the present invention. It should be noted that with this linear shift mechanism, the manual shift lever is rotatable about the longitudinal axis of the steering column. The linear shift system eliminates the long shift tube utilized with the concentric system and replaces it with a cam driver mechanism which can introduce lash into the system and can require intricate assembly.

SUMMARY OF THE INVENTION

It is preferable to use a linear shift system when a shift cable, as opposed to a rod linkage, is to be utilized between the operator control and the transmission shift valve. As a general rule, the cable mechanisms permit adjustment or alignment at assembly in a manner that is much simpler than a linkage system. Flexible cable mechanisms also permit adjustment during the life of the mechanism, if such is desirable, and in many instances, automatic adjusting is designed into the flexible cable mechanisms.

The present invention utilizes a linear shift mechanism in a steering column mounted arrangement. The mechanism disclosed herein has a manual operator control that is rotated, about an axis which is neither coaxial or parallel with the longitudinal axis of the steering column when transmission operating conditions are selected. By moving the rotary axis of the manual lever from the steering column axis, a more compact and simplified assembly is achieved.

This mechanism minimizes the opening in the steering column through which the shift lever extends. This is especially true when a tilt column is provided. The axis about which the manual lever rotates passes through a ball or swivel joint. The swivel joint center is also coincidental with the steering column tilt axis.

It is therefore an object of this invention to provide an improved transmission shift control assembly having a cable drive arm mounted in a bracket on a tiltable steering column for rotation about an axis nonparallel with the longitudinal axis of the steering column, and wherein the assembly also has a portion cooperating with a detent gate to establish the transmission operating positions, and further wherein an operator lever is mounted on a swivel joint in the bracket on the cable driver arm and is pivotable about one axis through the swivel joint for disconnecting the detent and rotatable about another axis of the swivel joint to permit the operator to move the cable driver arm to select the desired transmission operating conditions.

It is another object of this invention to provide an improved steering column mounted shift control assembly, wherein the manual operator lever is rotatable about an axis nonparallel with the longitudinal axis of the steering column to position the cable driver arm for transmission operation control, and wherein a detent plate cooperates by engaging with a positioning arm secured to the manual operator lever for establishing the operating position, and also wherein the manual lever is pivotally mounted relative to the driver arm to permit disengagement of the positing arm and the detent plate so that the operator arm can be rotated to select a new transmission operating condition through linear movement of a control cable and also wherein the steering column is tiltable about an axis which is coincidental with the ball joint center.

These and other objects and advantages of the present invention will be more apparent from the following specification and drawings.

DESCRIPTION OF THE EMBODIMENT

Figure 1:
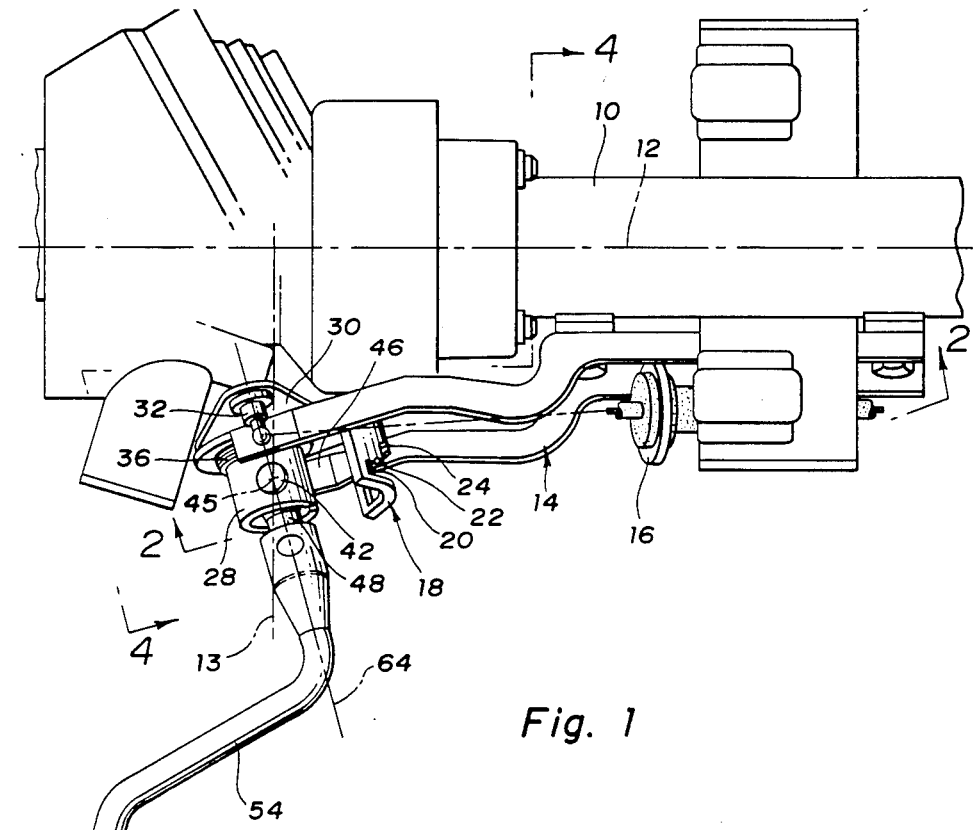
FIG. 1 is a top plan view of an exemplary embodiment of the invention.
Figure 2:
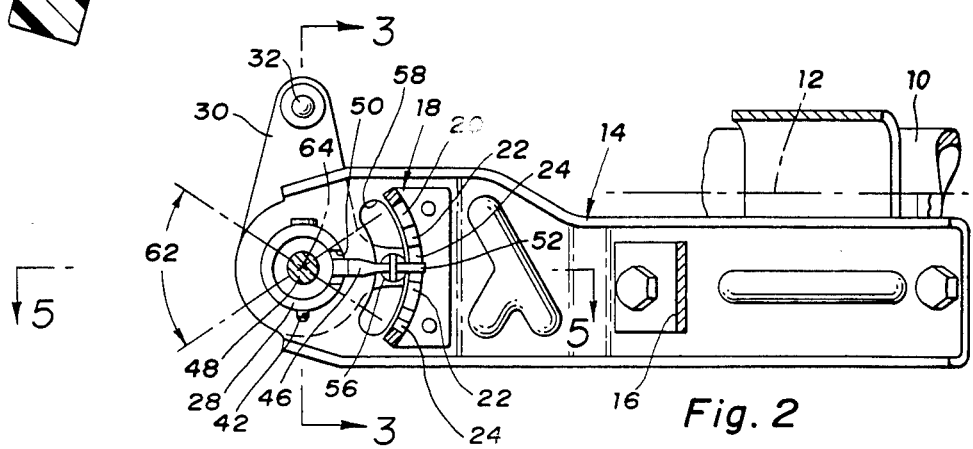
FIG. 2 is a view taken along line 2—2 of FIG. 1.

Referring to the drawings, and particularly FIGS. 1 through 5, there is seen a steering column 10 having a longitudinal axis 12 and a tilt axis 13. The steering column 10 includes a conventional tilting mechanism, not sown. A mounting bracket 14 is secured to the steering column 10 and has integrally formed therewith or otherwise secured thereto a cable attachment portion 16 and a detent portion 18. The detent portion 18 has a detent gate 20 which is comprised of a series of steps and slots such as those shown at 22 and 24 in FIG. 1. These steps or slots are designed to provide position stops for the transmission operating conditions, such as Park "P", Reverse "R", Neutral "N", Drive "D" and Low "L". These positions are shown in FIG. 2.

The bracket 14 has formed therein an opening or aperture 26 in which is rotatably disposed a body 28 to which is secured a cable drive arm 30. The cable drive arm 30 has a cable connector 32 to which is connected the movable portion of a cable which is disposed in the cable attachment 16. Such cable attachments are well known. The body 28 and the driver arm 30 are supported by bearing members 34 and are positioned in the aperture 26 by a locking ring 36. The body 28 has a pair of openings 38 and 40 in which is secured a mounting pin 42. The mounting pin 42 is operable to pivotally support a swivel or ball joint 44 on an axis 45. The swivel 44 has integrally formed therewith a positioning arm 46 and a driver extension 48.

The positioning arm 46 extends through a slot 50 formed in the body 28 and has a distal end 52 which is disposed in the detent gate 20 and cooperates with the steps and slots formed therein, to provide a transmission positioning stop mechanism. The positioning arm 46 is urged into the steps and slots of the detent gate 20 by a return spring 56. The return spring 56 is secured to the cable driver arm 30 and extends through an arcuate slot 58 formed in the bracket 14.

Figure 3:
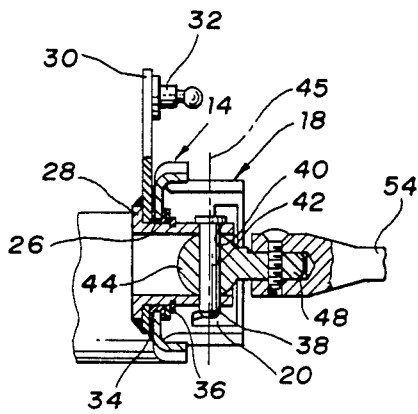
FIG. 3 is a view taken along line 3—3 of FIG. 2.
Figure 4:
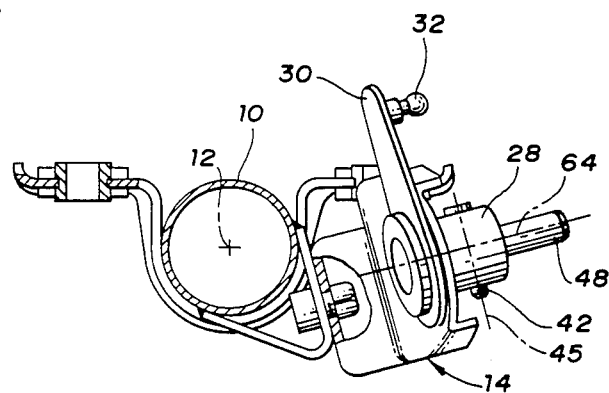
FIG. 4 is a view taken along line 4—4 of FIG. 1.
Figure 5:
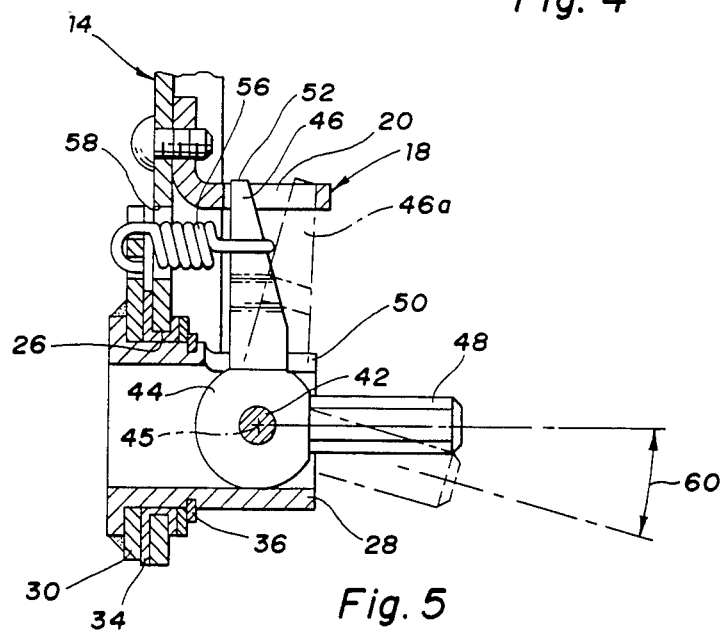
FIG. 5 is a view taken along line 5—5 of FIG. 2.

A manual operator lever 54 is attached to the driver extension 48 by a threaded fastener, as seen in FIG. 3. The operator lever 54 and therefore the swivel joint 44 are pivotable through an angular extent designated 60. When the operator lever 54 is pivoted to one extreme of the angular extent, the positioning arm 46 is moved to the position shown in phantom at 46a in FIG. 5. In this position, the positioning arm 46 is removed from the steps and slots of detent gate 20. The cable drive arm 30 can be moved through the angular extend designated 62 by rotation of the manual lever 54 about an axis 64 which, as seen in FIG. 1, is nonparallel with the longitudinal axis 12 of the steering column 10.

Since the body 28 and cable drive arm 30 are secured to the swivel joint 44 by the pin 32, these parts will also rotate through an angular range of motion identical to the angular extent 62. The angular or rotary motion of the driver arm 30 results in substantially linear motion of the cable member connected thereto.

When the operator has achieved the desired transmission operating condition through the rotation of the lever 54, the spring 56 is permitted to return the positioning arm 46 and the manual lever 54 to the spring set position shown in the drawings. The positioning arm 46 will engage the detent gate 20 in one of the steps and slots formed therein to limit further movement thereof without first pivoting the lever 54 through the angular extent 60.

The axes 13, 45 and 64 are substantially coincidental at the center of the swivel 44. Thus, when the steering column 10 is tilted, in a well known manner, about the axis 13, the position of the shift lever 54 is unchanged, since the shift lever 54 extends through a shroud, not shown, surrounding the shift column and tilt mechanism, only a minimum opening is required, this improves the appearance of the steering column and permits the use of the same structure both with and without a tilt mechanism.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. A transmission shift control assembly mounted on a tiltable steering column having a longitudinal axis and a tilting axis said assembly comprising: bracket means secured to said steering column; transmission shift cable means having a portion secured to said bracket means and a portion linearly movable relative to said secured portion; cable driver arm means having a rotary axis and being rotatably mounted on said rotary axis on said bracket means oblique to said longitudinal axis and including a cable connecting portion secured to said movable portion of said cable means; operator control means including pin means for pivotally mounting said operator control means on said cable drive arm means on a pivot axis substantially perpendicular to and intersecting said rotary axis and positioning arm means extending from said pin means; detent gate means disposed on said bracket means in position to abut said positioning arm means for limiting the extent of pivotal movement thereof, said detent gate means including a gear select detent plate means for engaging said positioning arm means at one pivotal extent for establishing operating positions in a transmission; spring means for urging said positioning arm into said detent gate means; and operator lever control means secured to said operator control means for manipulation by an operator for pivoting said operator control means on said pin means and for rotating said operator control means and said cable drive arm means about said rotary axis for selectively positioning said shift cable means to control the transmission at the operating position established by said detent plate means said tilting axis passing through the intersection of said rotary axis and said pivot axis.

2. A transmission shift control assembly mounted on a steering column having a longitudinal axis comprising: bracket means secured to said steering column; transmission shift cable means; cable driver arm means rotatably mounted on an axis on said bracket means in non-parallel relation with the longitudinal axis of said steering column and including a cable connecting portion secured to said cable means for enforcing substantially linear motion thereof; operator control means including a swivel joint and pin means pivotally mounting said swivel joint on said cable drive arm means on a pivotal axis substantially perpendicular to said rotary axis and including positioning arm means pivotal about said pivotal axis with said swivel joint; detent gate means disposed on said bracket means in position to abut said positioning arm means for limiting the extent of pivotal movement thereof, said detent gate means including a gear select detent plate means for engaging said positioning arm means at one pivotal extent for establishing operating positions in a transmission; spring means for urging said positioning arm into said detent gate means; and operator lever control means secured to said swivel joint and being manipulable by an operator for pivoting said swivel joint on said pin means and for rotating said operator control means and said cable drive arm means about said mounting axis for selectively positioning said shift cable means to control the transmission.

* * * * *